(12) United States Patent
Togino

(10) Patent No.: US 6,421,184 B1
(45) Date of Patent: Jul. 16, 2002

(54) OPTICAL PATH SPLITTING ELEMENT AND IMAGE DISPLAY APPARATUS USING THE SAME

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/935,633

(22) Filed: Aug. 24, 2001

(30) Foreign Application Priority Data

Aug. 24, 2000 (JP) ....................................... 2000-254052

(51) Int. Cl.[7] ............................................. G02B 27/14
(52) U.S. Cl. ..................... 359/636; 359/637; 359/631; 359/633
(58) Field of Search ............................... 359/631, 633, 359/636, 637

(56) References Cited

U.S. PATENT DOCUMENTS

| | | | |
|---|---|---|---|
| 5,392,158 A | 2/1995 | Tosaki | 345/8 |
| 5,712,649 A | 1/1998 | Tosaki | 359/633 |
| 5,739,955 A | 4/1998 | Marshall | 359/631 |

FOREIGN PATENT DOCUMENTS

| | | |
|---|---|---|
| JP | 07-287185 | 10/1995 |
| JP | 9-61748 | 3/1997 |
| JP | 09-181998 | 7/1997 |
| JP | 09-181999 | 7/1997 |

*Primary Examiner*—Ricky Mack
(74) *Attorney, Agent, or Firm*—Pillsbury Winthrop LLP

(57) ABSTRACT

An optical path splitting element for splitting a light beam from a single object into two optical paths (left and right) is made compact in size and given a power to reduce the number of components thereof. An image display apparatus uses the optical path splitting element. The left and right optical paths are not in plane symmetry with each other but in 180-degree rotational symmetry with respect to only a straight line passing through the center of the object. When a pair of reflecting surfaces (left and right) closest to the object side are defined as first reflecting surfaces and a pair of reflecting surfaces (left and right) closest to the exit side are defined as final reflecting surfaces, axial principal rays incident on the first reflecting surfaces and those exiting from the final reflecting surfaces are not coplanar with each other in either of the left and right optical paths. At least one pair of the reflecting surface pairs are formed from rotationally asymmetric curved reflecting surfaces having the function of correcting decentration aberrations.

15 Claims, 6 Drawing Sheets

OPTICAL PATH SPLITTING ELEMENT AND IMAGE DISPLAY APPARATUS USING THE SAME

This application claims benefit of Japanese Application No. 2000-254052 filed in Japan on Aug. 24, 2000, the contents of which are incorporated by this reference.

BACKGROUND OF THE INVENTION

1. Field of the Invention

The present invention relates to an optical path splitting element and an image display apparatus using the same. More particularly, the present invention relates to an optical path splitting element for splitting a light beam from a single object into two optical paths. The present invention also relates to a head- or face-mounted image display apparatus using such an optical path splitting element.

2. Discussion of Related Art

There has heretofore been known an optical path splitting element for leading an image displayed by a single display device to both eyes of an observer, as disclosed in Japanese Patent Application Unexamined Publication No. [hereinafter referred to as "JP(A)"] 9-181999. This splitting element uses a single prism to split a light beam from the displayed image into two optical paths extending in different directions.

In an image display apparatus using the above-described splitting element, however, when the image display device is reduced in size, it is necessary to shorten the focal length of the optical system while ensuring the required eye relief. Therefore, it is difficult to construct a viewing optical system of wide field angle.

There has also been proposed an image display device using a half-mirror to split an optical path as disclosed in JP(A) 9-061748.

In the above-described conventional optical path splitting element that splits the light beam into two optical paths extending in different directions, the size of the optical path splitting element becomes unfavorably large. Accordingly, an image display apparatus using the optical path splitting element becomes undesirably large in size and heavy in weight. The above-described conventional method of splitting an optical path by using a half-mirror suffers from the problem that because the light quantity is halved for each optical path, the image for observation becomes dark.

SUMMARY OF THE INVENTION

The present invention was made in view of the above-described problems with the prior art.

Accordingly, an object of the present invention is to provide a compact optical path splitting element having a reduced number of components and also provide an image display apparatus using the optical path splitting element. More specifically, the present invention provides an optical path splitting element having at least two split axial principal rays each extending from the center of an object to the center of an image. The optical path splitting element uses a three-dimensional optical system in which bent segments forming each of the axial principal rays lie in at least two planes, thereby making the optical path splitting element compact in size. At the same time, a power is given to the optical path splitting element to reduce the number of components thereof.

To attain the above-described object, the present invention provides an optical path splitting element for splitting a light beam from a single object into two optical paths. The optical paths in the optical path splitting element are not in plane symmetry with each other but in 180-degree rotational symmetry with respect to only a straight line passing through the center of the object. The optical path splitting element has at least two pairs of reflecting surfaces in the optical paths. When a pair of reflecting surfaces closest to the object side of the optical path splitting element among the at least two pairs of reflecting surfaces are defined as a left first reflecting surface and a right first reflecting surface, respectively, and a pair of reflecting surfaces closest to the exit side of the optical path splitting element among the at least two pairs of reflecting surfaces are defined as a left final reflecting surface and a right final reflecting surface, respectively, the optical paths in the optical path splitting element are arranged so that the entering optical axis of an axial principal ray incident on the left first reflecting surface and the exiting optical axis of the axial principal ray exiting from the left final reflecting surface are not coplanar with each other, and the entering optical axis of an axial principal ray incident on the right first reflecting surface and the exiting optical axis of the axial principal ray exiting from the right final reflecting surface are not coplanar with each other. At least one pair of the at least two pairs of reflecting surfaces are formed from rotationally asymmetric curved reflecting surfaces having the function of correcting decentration aberrations.

In addition, the present invention provides an image display apparatus including an optical path splitting element for splitting a light beam from a single object into two optical paths. The optical paths in the optical path splitting element are not in plane symmetry with each other but in 180-degree rotational symmetry with respect to only a straight line passing through the center of the object. The optical path splitting element has at least two pairs of reflecting surfaces in the optical paths. When a pair of reflecting surfaces closest to the object side of the optical path splitting element among the at least two pairs of reflecting surfaces are defined as a left first reflecting surface and a right first reflecting surface, respectively, and a pair of reflecting surfaces closest to the exit side of the optical path splitting element among the at least two pairs of reflecting surfaces are defined as a left final reflecting surface and a right final reflecting surface, respectively, the optical paths in the optical path splitting element are arranged so that the entering optical axis of an axial principal ray incident on the left first reflecting surface and the exiting optical axis of the axial principal ray exiting from the left final reflecting surface are not coplanar with each other, and the entering optical axis of an axial principal ray incident on the right first reflecting surface and the exiting optical axis of the axial principal ray exiting from the right final reflecting surface are not coplanar with each other. At least one pair of the at least two pairs of reflecting surfaces are formed from rotationally asymmetric curved reflecting surfaces having the function of correcting decentration aberrations. The image display apparatus further includes an image display device placed at the position of the object. The left and right eyeballs of an observer are placed at left and right exit pupils formed in the left and right optical paths exiting the optical path splitting element, thereby allowing observation of an image displayed by the image display device.

The reasons for adopting the above-described arrangements in the present invention, together with the functions thereof, will be described below.

FIG. 1 is a perspective view schematically showing the surfaces and optical axes of a viewing optical system of an image display apparatus according to Example 1 (described later). The viewing optical system includes an optical path splitting element 10 and a pair of ocular optical systems 20L and 20R (left and right). The optical path splitting element 10 is formed from a decentered prism. The viewing optical system has a single image display device 1 common to left and right optical systems. A display light beam from the image display device 1 is split into left and right beams through the optical path splitting element 10. The beams are passed through the left and right ocular optical systems 20L and 20R to project enlarged images of the image display device 1 into the left and right eyeballs of an observer. In Example 1, the optical path splitting element 10 has a first surface 11 as a common entrance surface (refracting surface) through which left and right axial principal rays 2L and 2R emanating from the image display device 1 at an angle to each other enter the optical path splitting element 10. Regarding the left optical path, the optical path splitting element 10 has a second surface 12L, a third surface 13L, a fourth surface 14L, and a fifth surface 15L. The second surface 12L reflects the left axial principal ray 2L entering through the first surface 11. The third surface 13L reflects the left axial principal ray 2L reflected from the second surface 12L. The fourth surface 14L reflects the left axial principal ray 2L reflected from the third surface 13L. The fifth surface 15L is an exit surface (refracting surface) through which the left axial principal ray 2L reflected from the fourth surface 14L exits the optical path splitting element 10 so as to enter the left ocular optical system 20L. Regarding the right optical path, the optical path splitting element 10 has a second surface 12R, a third surface 13R, a fourth surface 14R, and a fifth surface 15R. The second surface 12R reflects the right axial principal ray 2R entering through the first surface 11. The third surface 13R reflects the right axial principal ray 2R reflected from the second surface 12R. The fourth surface 14R reflects the right axial principal ray 2R reflected from the third surface 13R. The fifth surface 15R is an exit surface (refracting surface) through which the right axial principal ray 2R reflected from the fourth surface 14R exits the optical path splitting element 10 so as to enter the right ocular optical system 20R. The left and right reflecting surfaces 12L to 14L and 12R to 14R are formed from back-coated mirrors.

The surface configurations of the above-described surfaces, i.e. from the first surface 11 to the left and right exit surfaces 15L and 15R, are determined so that the configurations of the left and right axial principal rays 2L and 2R emanating from the image display device 1 in the object plane and exiting from the left and right fifth surfaces 15L and 15R as exit surfaces are in 180-degree rotational symmetry with respect to a straight line A–A' passing through the center of the display surface of the image display device 1 at approximately right angles to the display surface. To form left and right optical paths that are in 180-degree rotational symmetry with each other as stated above, the optical path splitting element 10, which is a decentered prism, should be constructed by arranging the first surface 11, the second surfaces 12R and 12L, the third surfaces 13R and 13L, the fourth surfaces 14R and 14L, and the fifth surfaces 15R and 15L so that when an optical system for the right optical path formed from the first surface 11, the second surface 12R, the third surface 13R, the fourth surface 14R and the fifth surface 15R is rotated through 180 degrees about the straight line A–A', these surfaces are coincident with the first surface 11, the second surface 12L, the third surface 13L, the fourth surface 14L and the fifth surface 15L, which form an optical system for the left optical path. In this case, the axial principal ray 2R (2L) extending from the first surface 11 to the fifth surface 15R (15L) passes along a three-dimensionally decentered optical path. Therefore, it is necessary to select a surface configuration and arrangement for each surface so that the entering optical axis of the axial principal ray 2R (2L) incident on the second surface 12R (12L) as a first reflecting surface and the exiting optical axis of the axial principal ray 2R (2L) exiting from the fourth surface 14R (14L) as the final reflecting surface are not coplanar with each other.

To allow the optical path splitting element 10 to be used as a part of a viewing optical system for distributing an image displayed by the single image display device 1 to the left and right eyeballs of an observer, it is necessary to select a surface configuration and arrangement for each surface of the optical path splitting element 10 so that the left and right optical axes, which are coincident with the left and right axial principal rays 2L and 2R emerging from the left and right exit surfaces (refracting surfaces) 15L and 15R, are approximately parallel to each other so as to extend in approximately the same direction.

In the optical path splitting element 10 according to the present invention, it is desirable that at least one of the left and right reflecting surface pairs, i.e. the second surfaces 12R and 12L, the third surfaces 13R and 13L, and the fourth surfaces 14R and 14L, should be formed from rotationally asymmetric curved reflecting surfaces having the function of correcting decentration aberrations.

In the optical path splitting element 10 according to the present invention, three-dimensionally decentered optical paths are formed, as has been stated above. Consequently, the reflecting surfaces are decentered. Moreover, if an optical power is given to such a decentered reflecting surface, decentration aberrations occur. To correct the decentration aberrations, the optical path splitting element 10 needs to have at least one pair of reflecting surfaces having a rotationally asymmetric curved surface configuration.

In the present invention, a free-form surface is used as a typical example of a surface having a rotationally asymmetric curved surface configuration. A free-form surface is defined by the following equation. The Z-axis of the defining equation is the axis of a free-form surface.

$$Z = cr^2 / \left[ 1 + \sqrt{\{1 - (1+k)c^2 r^2\}} \right] + \sum_{j=2}^{66} C_j X^m Y^n \quad (a)$$

In the equation (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$

-continued $$C_{27}XY^5 + C_{28}Y^6 + C_{29}X^7 + C_{30}X^6Y + C_{31}X^5Y^2 +$$
$$C_{32}X^4Y^3 + C_{33}X^3Y^4 + C_{34}X^2Y^5 + C_{35}XY^6 +$$
$$C_{36}Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the X-axis.

$$x = R \times \cos(A)$$ (b)
$$y = R \times \sin(A)$$
$$z = D_2 + D_3 R\cos(A) + D_4 R\sin(A) + D_5 R^2\cos(2A) +$$
$$D_6(R^2 - 1) + D_7 R^2 \sin(2A) +$$
$$D_8 R^3 \cos(3A) + D_9(3R^3 - 2R)\cos(A) +$$
$$D_{10}(3R^3 - 2R)\sin(A) + D_{11}R^3\sin(3A) + D_{12}R^4\cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16}R^4\sin(4A) +$$
$$D_{17}R^5\cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22}R^5\sin(5A) +$$
$$D_{23}R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29}R^6\sin(6A) \ldots$$

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above defining equations are shown to exemplify surfaces with a rotationally asymmetric curved surface configuration. Therefore, the same advantageous effects can be obtained for any other defining equation that expresses such a rotationally asymmetric curved surface configuration.

It should be noted that other examples of defining equations for free-form surfaces include the following defining equation (c):

$$Z = \Sigma\Sigma C_{nm}XY$$ (c)

Assuming that k=7 (polynomial of degree 7), for example, a free-form surface is expressed by an expanded form of the above equation as follows:

$$Z = C_2 + C_3Y + C_4|X| + C_5Y^2 + C_6Y|X| + C_7X^2 + C_8Y^3 +$$
$$C_9Y^2|X| + C_{10}YX^2 + C_{11}|X^3| + C_{12}Y^4 + C_{13}Y^3|X| +$$
$$C_{14}Y^2X^2 + C_{15}Y|X^3| + C_{16}X^4 + C_{17}Y^5 + C_{18}Y^4|X| +$$
$$C_{19}Y^3X^2 + C_{20}Y^2|X^3| + C_{21}YX^4 + C_{22}|X^5| +$$
$$C_{23}Y^6 + C_{24}Y^5|X| + C_{25}Y^4X^2 + C_{26}Y^3|X^3| +$$
$$C_{27}Y^2X^4 + C_{28}Y|X^5| + C_{29}X^6 + C_{30}Y^7 + C_{31}Y^6|X| +$$
$$C_{32}Y^5X^2 + C_{33}Y^4|X^3| + C_{34}Y^3X^4 + C_{35}Y^2|X^5| +$$
$$C_{36}YX^6 + C_{37}|X^7|$$

It should be noted that an anamorphic surface or a toric surface is also usable as a surface having a rotationally asymmetric curved surface configuration.

It should be noted that the optical path splitting element 10 according to the present invention can have at least three pairs of reflecting surfaces for the left and right optical paths, i.e. the second surfaces 12R and 12L, the third surfaces 13R and 13L, and the fourth surfaces 14R and 14L, as in the example shown in FIG. 1. In this case, it is desirable that the at least three pairs of reflecting surfaces should be formed from rotationally asymmetric curved reflecting surfaces having the function of correcting decentration aberrations.

The above-described optical path splitting element 10 according to the present invention can be used as at least a part of a viewing optical system for distributing an image displayed by a single image display device 1 to the left and right eyeballs of an observer, as shown in FIG. 1, by way of example. In actuality, it is desirable that the left and right ocular optical systems 20L and 20R should be placed in the left and right exiting optical paths, whereby intermediate images 3L and 3R formed in the left and right optical paths (in Example 1, intermediate images 3L and 3R are formed within the prism between the fourth surfaces 14L and 14R and the fifth surfaces 15L and 15R, respectively) are viewed as enlarged images through the ocular optical systems 20L and 20R. In this case, left and right exit pupils 4L and 4R of the left and right viewing optical paths are formed at the respective exit sides of the left and right ocular optical systems 20L and 20R. Therefore, the observer's left and right eyes are placed at the positions of the left and right exit pupils 4L and 4R to view the enlarged intermediate images 3L and 3R.

Incidentally, the surface configurations of the surfaces of the left and right optical systems, i.e. from the first surface 11 to the left and right fifth surfaces 15L and 15R, are determined so that the configurations of the left and right axial principal rays 2L and 2R emanating from the image display device 1 and exiting from the left and right fifth surfaces 15L and 15R as exit surfaces are in 180-degree rotational symmetry with respect to a straight line A–A' passing through the center of the display surface of the image display device 1 at approximately right angles to the display surface, as has been stated above. Accordingly, the left optical system extending from the first surface 11 to the fifth surface 15L and the right optical system extending from the first surface 11 to the fifth surface 15R are in 180-degree rotational symmetry about the straight line A–A'. Moreover, the left and right optical systems are three-dimensionally decentered reflecting optical systems. Therefore, the intermediate images 3L and 3R are generally rotated through the same angle in the same direction about the respective optical axes. Accordingly, an image naturally oriented with respect to both the horizontal and vertical directions cannot be observed unless the image display device 1, which is placed in the object plane, is rotated in the opposite direction to the direction of rotation of the intermediate images 3L and 3R through the same angle as the angle of rotation about the straight line A–A' as an axis of rotation so that the horizontal direction of the image display area of the image display device 1 is at an angle to a plane containing the left and right optical paths emerging from the optical path splitting element 10 (in the case of a viewing optical system for observation with two eyes, this plane is parallel to a horizontal direction connecting the centers of the pupils of the two eyes).

Incidentally, it is desirable to satisfy the following condition:

$$10° < \theta < 150° \quad (1)$$

where θ is the angle formed between the axial principal rays 2L and 2R of left and right light beams led from each pixel in the center of the image display device 1 to the left and right eyes of the observer (i.e. the angle formed between the axial principal rays 2L and 2R before being incident on the first surface 11).

The condition (1) needs to be satisfied in order to separate the image light beams for the two eyes appropriately. If θ is not larger than the lower limit, i.e. 10°, the effective diameter portions of the left and right optical surfaces, particularly those of the first surfaces 2L and 2R undesirably overlap each other. Accordingly, the optical system has to be increased in size in order to ensure the required effective diameter of each of the first surfaces 2L and 2R and hence becomes unsuitable for use as the optical system of a head- or face-mounted image display apparatus. Conversely, if θ is not smaller than the upper limit, i.e. 150°, an image display device having very wide viewing angle characteristics is needed to serve as the image display device 1. At the same time, the solid angle of the image light beam becomes small. As a result, it becomes impossible to observe a bright image. Regarding the angle θ, it is preferable to satisfy the following condition:

$$15° < \theta < 120° \quad (1\text{-}1)$$

In Example 1 (described later), θ=41.12°. In Example 2, θ=32.54°.

The above-described optical path splitting element 10 is also usable to combine together rays in two optical paths by using the optical paths reversely instead of splitting an optical path from a single object as stated above.

The above-described image display apparatus can be used as an image pickup apparatus in which an image pickup device is provided in place of the image display device 1 in the above-described arrangement. In this case, the exit pupils 4L and 4R are arranged as entrance pupils through which a light beam from a subject passes, and a subject image is formed on the image pickup device.

Further, the image display apparatus can be used as a projection apparatus in which a projection object is provided in place of the image display device 1 in the foregoing arrangement. A screen is placed in front of the exit pupils 4L and 4R to form a projected image of the projection object on the screen.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 and 2 in which the optical path splitting element according to the present invention is used in an image display apparatus will be described below.

A coordinate system used in the following Examples is defined as follows. The direction of the observer's visual axis (forward direction) is defined as a Z-axis. The horizontal direction of the observer is defined as an X-axis, and the vertical direction of the observer is defined as a Y-axis.

In numerical data (shown later) in each Example, data is shown with respect to the viewing optical system for the right eye as data obtained by backward ray tracing from the exit pupil 4R for the right eye to the image display device (image plane) 1. Regarding the viewing optical system for the left eye, numerical data is not shown. In Example 1, the viewing optical system for the left eye has a configuration obtained by rotating the optical system for the right eye through 180 degrees about the straight line A–A' passing through the center (vertex position) of the image display device (image plane) 1 at right angles thereto. In Example 2, a part of the left viewing optical system that extends from the object plane to the intermediate image plane (IIM) of surface No. 5 is the same as that of the optical system for the right eye. The remaining part of the viewing optical system for the left eye, i.e. from the surface No. 6 to the image plane, has a configuration obtained by rotating the corresponding part of the optical system for the right eye through 180 degrees about a line (optical axis) normal to the vertex position of the intermediate image plane (IIM). The whole viewing optical system for the left eye is constructed by horizontally moving the optical system so that the image plane thereof is coincident with the image plane of the optical system for the right eye.

In the following Examples 1 and 2, each optical path splitting element 10 is formed from a three-dimensionally decentered prism, which is decentered in three directions, i.e. X, Y and Z directions. Examples 1 and 2 will be described below with reference to the accompanying drawings.

EXAMPLE 1

Figure 1:
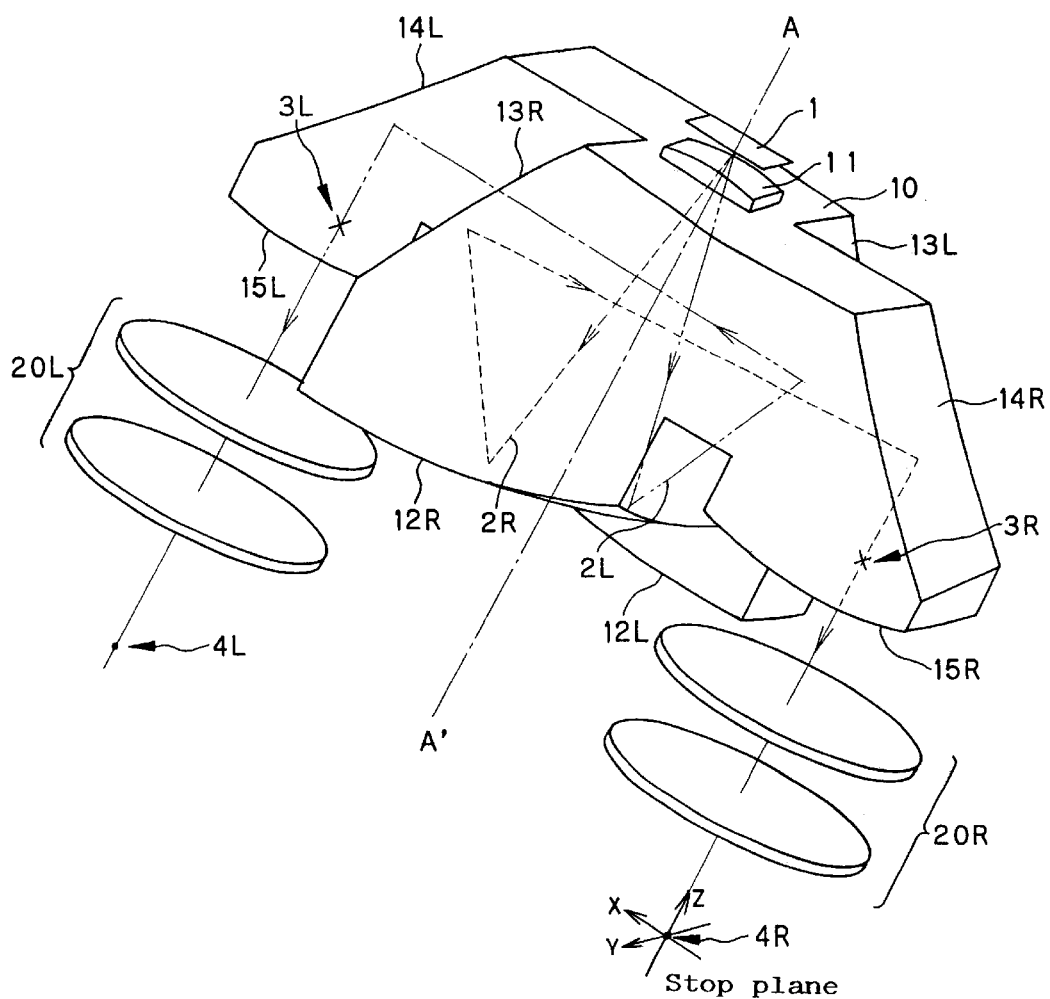
FIG. 1 is a perspective view schematically showing the surfaces and optical axes of a viewing optical system of an image display apparatus according to Example 1 of the present invention.
Figure 2:
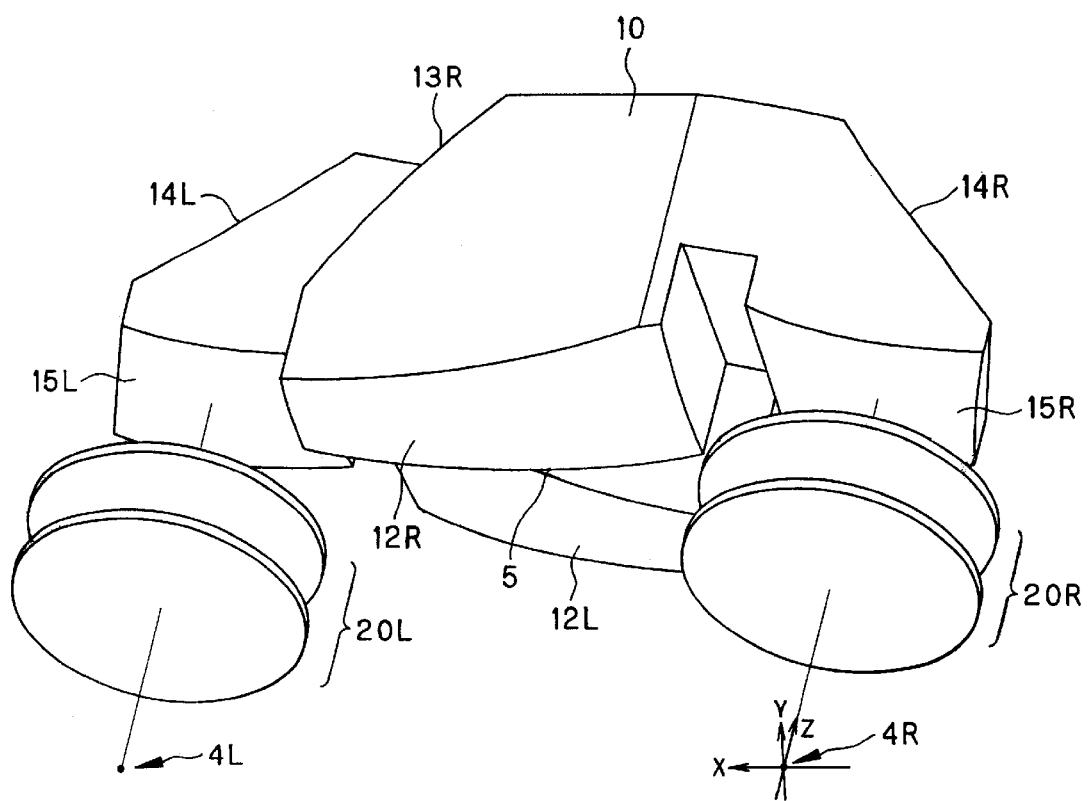
FIG. 2 is a perspective view schematically showing the surfaces of the viewing optical system of the image display apparatus according to Example 1 as seen from a direction different from that in FIG. 1.

FIG. 1 is a perspective view schematically showing the surfaces and optical axes of a viewing optical system of an image display apparatus according to Example 1. FIG. 2 is a perspective view showing the surfaces of the viewing optical system of the image display apparatus according to Example 1 as seen from a direction different from that in FIG. 1.

The illustrated optical system is a viewing optical system of the image display apparatus when arranged as a head-mounted image display apparatus designed to be fitted for both eyes. The viewing optical system includes an optical path splitting element 10 and a pair of ocular optical systems 20L and 20R (left and right). The optical path splitting element 10 is formed from a decentered prism. The viewing optical system has a single image display device 1 common to left and right optical systems. A display light beam from the image display device 1 is split into left and right beams through the optical path splitting element 10. The beams are passed through the left and right ocular optical systems 20L and 20R to project enlarged images of the image display device 1 into the left and right eyeballs of an observer. The optical path splitting element 10 has a first surface 11 as a common entrance surface (refracting surface) through which left and right axial principal rays 2L and 2R emanating from the image display device 1 at an angle to each other enter the optical path splitting element 10. Regarding the left optical path, the optical path splitting element 10 has a second surface 12L, a third surface 13L, a fourth surface 14L, and a fifth surface 15L. The second surface 12L reflects the left axial principal ray 2L entering through the first surface 11. The third surface 13L reflects the left axial principal ray 2L reflected from the second surface 12L. The fourth surface 14L reflects the left axial principal ray 2L reflected from the third surface 13L. The fifth surface 15L is an exit surface (refracting surface) through which the left axial principal ray 2L reflected from the fourth surface 14L exits the optical path splitting element 10 so as to enter the left ocular optical system 20L. Regarding the right optical path, the optical path splitting element 10 has a second surface 12R, a third surface 13R, a fourth surface 14R, and a fifth surface 15R. The second surface 12R reflects the right axial principal ray 2R entering through the first surface 11. The third surface 13R reflects the right axial principal ray 2R reflected from the second surface 12R. The fourth surface 14R reflects the right axial principal ray 2R reflected from the third surface 13R. The fifth surface 15R is an exit surface (refracting surface) through which the right axial principal ray 2R reflected from the fourth surface 14R exits the optical path splitting element 10 so as to enter the right ocular optical system 20R. The left and right reflecting surfaces 12L to 14L and 12R to 14R are formed from back-coated mirrors.

The surface configurations of the above-described surfaces, i.e. from the first surface 11 to the left and right exit surfaces 15L and 15R, are determined so that the configurations of the left and right axial principal rays 2L and 2R emanating from the image display device 1 and exiting from the left and right fifth surfaces 15L and 15R as exit surfaces are in 180-degree rotational symmetry with respect to a straight line A–A' passing through the center of the display surface of the image display device 1 at approximately right angles to the display surface. To form left and right optical paths that are in 180-degree rotational symmetry with each other as stated above, the optical path splitting element 10, which is a decentered prism, is constructed by arranging the first surface 11, the second surfaces 12R and 12L, the third surfaces 13R and 13L, the fourth surfaces 14R and 14L, and the fifth surfaces 15R and 15L so that when an optical system for the right optical path formed from the first surface 11, the second surface 12R, the third surface 13R, the fourth surface 14R and the fifth surface 15R is rotated through 180 degrees about the straight line A–A', these surfaces are coincident with the first surface 11, the second surface 12L, the third surface 13L, the fourth surface 14L and the fifth surface 15L, which form an optical system for the left optical path.

The left and right axial principal rays 2L and 2R emerging from the left and right exit surfaces (refracting surfaces) 15L and 15R of the optical path splitting element 10 extend parallel to each other in the same direction. The left and right ocular optical systems 20L and 20R are placed in the left and right optical paths. The left and right ocular optical systems 20L and 20R are identical with each other and each formed from two rotationally symmetric lenses. In cooperation with the refracting surfaces of the left and right exit surfaces 15L and 15R, the left and right ocular optical systems 20L and 20R allow the intermediate images 3L and 3R formed within the prism to be observed as enlarged images and also form exit pupils 4L and 4R of the left and right optical systems at the respective exit sides of the ocular optical systems 20L and 20R.

It should be noted that the ocular optical systems 20L and 20R may be formed from rotationally symmetric aspherical surfaces, anamorphic surfaces, toric surfaces, or free-form surfaces to cancel decentration aberrations produced in the optical path splitting element 10. It is also possible to use spherical lenses in a decentered position.

In this Example, a display device of 8.9×6.7 millimeters in size is used as the image display device 1. The pupil diameter is 6 millimeters in the X-direction and 4 millimeters in the Y-direction. That is, each exit pupil is rectangular. Regarding the viewing field angles, the horizontal field angle is 25°, and the vertical field angle is 18.9°.

EXAMPLE 2

Figure 3:
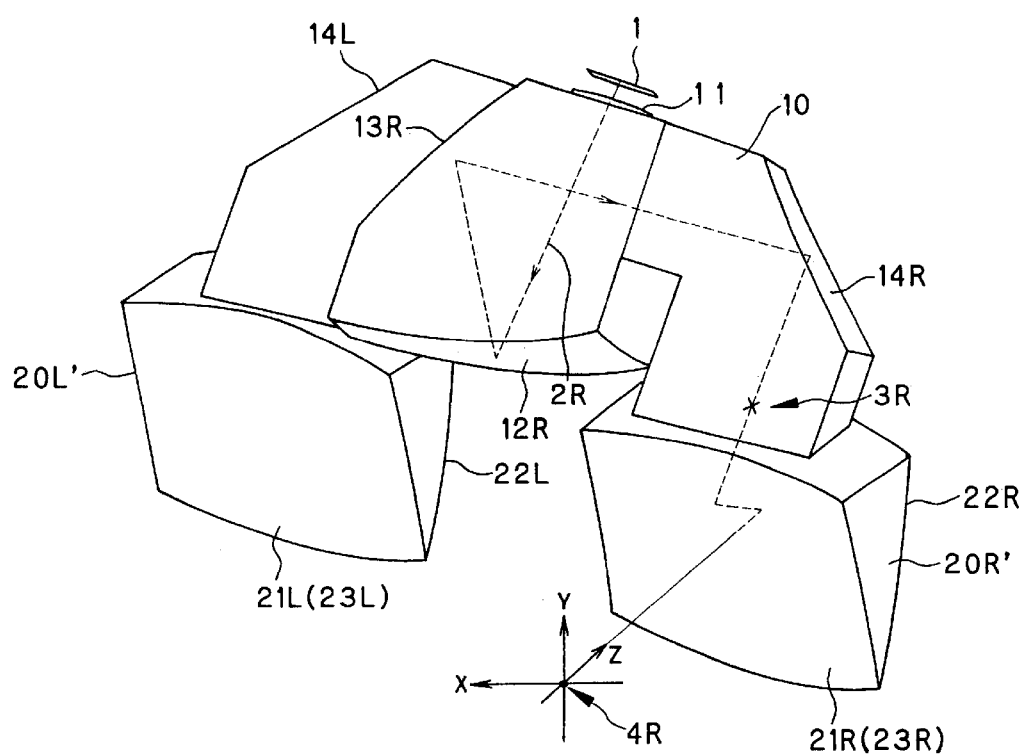
FIG. 3 is a perspective view schematically showing the surfaces and right optical axis of a viewing optical system of an image display apparatus according to Example 2 of the present invention.
Figure 4:
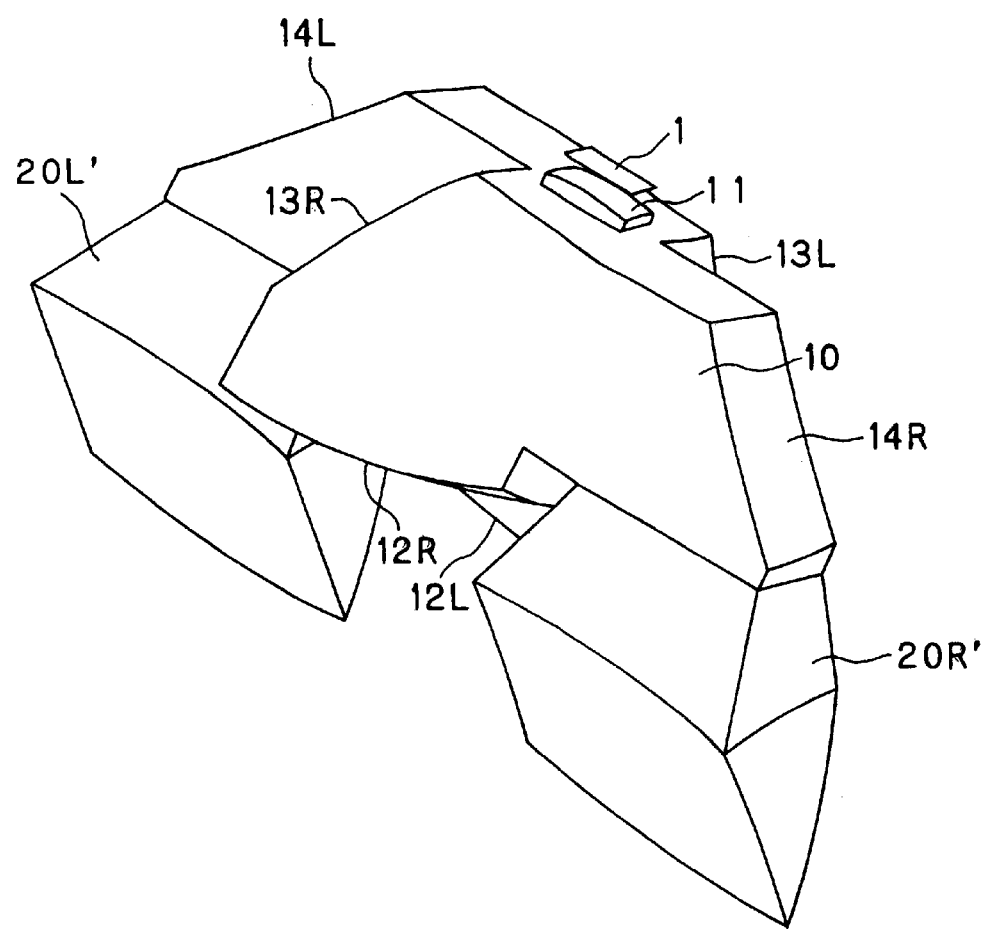
FIG. 4 is a perspective view showing the whole viewing optical system of the image display apparatus according to Example 2 as seen from a direction different from that in FIG. 3.

FIG. 3 is a perspective view schematically showing the surfaces and right optical axis of a viewing optical system of an image display apparatus according to Example 2. FIG. 4 is a perspective view showing the whole viewing optical system as seen from a direction different from that in FIG. 3.

The illustrated optical system is a viewing optical system of the image display apparatus when arranged as a head-mounted image display apparatus designed to be fitted for both eyes. The viewing optical system uses an optical path splitting element 10 similar to that in Example 1. In Example 2, however, ocular optical systems 20L' and 20R' are each formed by integrally cementing a decentered prism to the exit surface side of the optical path splitting element 10. The decentered prism is of the type in which there are two internal reflections. Accordingly, the optical path splitting element 10 has no fifth surfaces 15L and 15R.

Thus, the viewing optical system of Example 2 includes an optical path splitting element 10 formed from a decentered prism and left and right ocular optical systems 20L' and 20R' integrally cemented to the optical path splitting element 10. The viewing optical system has a single image display device 1 common to left and right optical systems. A display light beam from the image display device 1 is split into left and right beams through the optical path splitting element 10. The beams are passed through the left and right ocular optical systems 20L' and 20R' to project enlarged images of the image display device 1 into the left and right eyeballs of an observer. The part constituting the optical path splitting element 10 has a first surface 11 as a common entrance surface (refracting surface) through which left and right axial principal rays 2L and 2R emanating from the image display device 1 at an angle to each other enter the optical path splitting element 10. Regarding the left optical path, the optical path splitting element 10 has a second surface 12L, a third surface 13L, and a fourth surface 14L. The second surface 12L reflects the left axial principal ray 2L entering through the first surface 11. The third surface 13L reflects the left axial principal ray 2L reflected from the second surface 12L. The fourth surface 14L reflects the left axial principal ray 2L reflected from the third surface 13L. Regarding the right optical path, the optical path splitting element 10 has a second surface 12R, a third surface 13R, and a fourth surface 14R. The second surface 12R reflects the right axial principal ray 2R entering through the first surface 11. The third surface 13R reflects the right axial principal ray 2R reflected from the second surface 12R. The fourth surface 14R reflects the right axial principal ray 2R reflected from the third surface 13R. The left and right reflecting surfaces 12L to 14L and 12R to 14R are formed from back-coated mirrors.

The surface configurations of the above-described surfaces, i.e. from the first surface 11 to the left and right fourth surfaces (reflecting surfaces) 14L and 14R, are determined so that the configurations of the left and right axial principal rays 2L and 2R emanating from the image display device 1 and reflected from the left and right fourth surfaces 14L and 14R are in 180-degree rotational symmetry with respect to a straight line A–A' (FIG. 1) passing through the center of the display surface of the image display device 1 at approximately right angles to the display surface, as in the case of Example 1. To form left and right optical paths that are in 180-degree rotational symmetry with each other as stated above, the part constituting the optical path splitting element 10, which is a decentered prism, is constructed by arranging the first surface 11, the second surfaces 12R and 12L, the third surfaces 13R and 13L, and the fourth surfaces 14R and 14L so that when an optical system for the right optical path formed from the first surface 11, the second surface 12R, the third surface 13R and the fourth surface 14R is rotated through 180 degrees about the straight line A–A', these surfaces are coincident with the first surface 11, the second surface 12L, the third surface 13L and the fourth surface 14L, which form an optical system for the left optical path.

The left and right axial principal rays 2L and 2R reflected from the left and right reflecting surfaces 15L and 15R of the optical path splitting element 10 are parallel to each other and form intermediate images 3L and 3R before entering the parts constituting the left and right ocular optical systems 20L' and 20R', which are decentered prisms. The ocular optical systems 20L' and 20R' are identical with each other and in symmetry with respect to a plane passing through the middle between the parallel-reflected left and right axial principal rays 2L and 2R at right angles to a plane containing the axial principal rays 2L and 2R. Therefore, only the arrangement for the right eye will be described below. A light beam reflected from the fourth surface 14R of the optical path splitting element 10 is incident on a first surface 21R of the right ocular optical system 20R' at an angle exceeding the critical angle. The first surface 21R also serves as a third surface 23R, which is a refracting surface. Consequently, the light beam is totally reflected by the first surface 21R and then internally reflected by a second surface 22R. The reflected light beam exits the right ocular optical system 20R' while being refracted through the third surface 23R and passes through an exit pupil 4R, thereby allowing the intermediate image 3R to be observed as an enlarged image.

In this Example, a display device of 8.9×6.7 millimeters in size is used as the image display device 1. The pupil diameter is 12 millimeters in the X-direction and 4 millimeters in the Y-direction. That is, each exit pupil is rectangular. The difference in interpupillary distance among observers is absorbed by increasing the exit pupil size of the optical system in the X-direction. By doing so, it is possible to omit a mechanical interpupillary distance adjusting mechanism. Regarding the viewing field angles, the horizontal field angle is 30°, and the vertical field angle is 26.6°.

In this Example, a part of the left viewing optical system that extends from the object plane to the intermediate image plane (IIM) of surface No. 5 is the same as that of the optical system for the right eye in the numerical data (shown later), as has been stated above. The remaining part of the viewing optical system for the left eye, i.e. from the surface No. 6 to the image plane, has a configuration obtained by rotating the corresponding part of the optical system for the right eye through 180 degrees about a line (optical axis) normal to the vertex position of the intermediate image plane (IIM). The whole viewing optical system for the left eye is constructed by horizontally moving the optical system so that the image plane thereof is coincident with the image plane of the optical system for the right eye. The optical path splitting element for the right eye and the optical path splitting element for the left eye are integrally formed as one unit. The optical paths in the optical path splitting element 10 part are in rotational symmetry with respect to a line perpendicular to the center of the image display surface. The left and right optical paths in the ocular optical system 20L' and 20R' are in plane symmetry with each other.

Next, constituent parameters in the above-described Examples 1 and 2 will be shown. In the constituent parameters in each Example, the right axial principal ray 2R is defined by a light ray passing perpendicularly through the center of the right exit pupil 4R of the optical system and reaching the center of the image display device 1 in the backward ray tracing. Further, in the backward ray tracing, the center of the pupil 4R is defined as the origin of each decentered optical surface constituting a decentered optical system, as shown in FIGS. 1 and 3. The direction along which the axial principal ray 2R travels from the pupil 4R toward the ocular optical system 20R (20R') is defined as a Z-axis. The direction in which the Z-axis extends from the pupil 4R toward the ocular optical system 20R (20R') is defined as a positive direction of the Z-axis. A horizontal plane is defined as an XZ-plane. A vertical plane is defined as a YZ-plane. The direction in which the X-axis extends leftward in the horizontal plane is defined as a positive direction of the X-axis. The direction in which the Y-axis extends upward in the vertical direction is defined as a positive direction of the Y-axis.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical functional surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+\ldots \quad (d)$$

In the above equation, Z is an optical axis (axial principal ray) for which the direction of travel of light is defined as a positive direction, and y is taken in a direction perpendicular to the optical axis. R is a paraxial curvature radius, and K is a conic constant. A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

It should be noted that in the tables showing constituent parameters below, "FFS" denotes a free-form surface, and "ASS" denotes an aspherical surface. Further, "RE" denotes a reflecting surface, and "IIM" denotes an intermediate image plane.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | ASS① | | (1) | 1.5254 | 56.2 |
| 3 | FFS①(RE) | | (2) | 1.5254 | 56.2 |
| 4 | ASS①(RE) | | (1) | 1.5254 | 56.2 |
| 5 | ∞(IIM) | | (3) | 1.5254 | 56.2 |
| 6 | FFS②(RE) | | (4) | 1.5254 | 56.2 |
| 7 | FFS③(RE) | | (5) | 1.5254 | 56.2 |
| 8 | FFS④(RE) | | (6) | 1.5254 | 56.2 |
| 9 | ASS②(RE) | | (7) | | |
| Image plane | ∞ | | (8) | | |

ASS①

| | |
|---|---|
| R | −83.20 |
| K | 0.0000 |
| A | $2.7572 \times 10^{-6}$ |
| B | $-8.0590 \times 10^{-10}$ |

ASS②

| | |
|---|---|
| R | −16.07 |
| K | 0.0000 |
| A | $1.0135 \times 10^{-4}$ |

FFS①

| | | | | | |
|---|---|---|---|---|---|
| $C_4$ | $-9.4211 \times 10^{-3}$ | $C_6$ | $-1.0652 \times 10^{-2}$ | $C_8$ | $4.9563 \times 10^{-6}$ |
| $C_{10}$ | $4.2873 \times 10^{-5}$ | $C_{11}$ | $-3.5143 \times 10^{-8}$ | $C_{13}$ | $3.5874 \times 10^{-7}$ |
| $C_{15}$ | $-7.1617 \times 10^{-7}$ | $C_{17}$ | $-1.9762 \times 10^{-8}$ | $C_{19}$ | $-3.5068 \times 10^{-8}$ |
| $C_{21}$ | $-5.6908 \times 10^{-8}$ | | | | |

FFS②

| | | | | | |
|---|---|---|---|---|---|
| $C_4$ | $-2.3265 \times 10^{-4}$ | $C_5$ | $2.5719 \times 10^{-3}$ | $C_6$ | $-5.6313 \times 10^{-3}$ |
| $C_7$ | $-6.9711 \times 10^{-5}$ | $C_8$ | $-4.6909 \times 10^{-4}$ | $C_9$ | $6.8773 \times 10^{-5}$ |
| $C_{10}$ | $-2.5412 \times 10^{-4}$ | $C_{11}$ | $-7.9766 \times 10^{-7}$ | $C_{12}$ | $-1.2161 \times 10^{-5}$ |
| $C_{13}$ | $4.1658 \times 10^{-6}$ | $C_{14}$ | $-8.8727 \times 10^{-6}$ | $C_{15}$ | $2.2400 \times 10^{-5}$ |
| $C_{16}$ | $1.6733 \times 10^{-6}$ | $C_{17}$ | $5.6098 \times 10^{-6}$ | $C_{18}$ | $6.2886 \times 10^{-6}$ |
| $C_{19}$ | $6.5129 \times 10^{-6}$ | $C_{20}$ | $2.6957 \times 10^{-6}$ | $C_{21}$ | $1.2697 \times 10^{-6}$ |

FFS③

| | | | | | |
|---|---|---|---|---|---|
| $C_4$ | $-4.4861 \times 10^{-3}$ | $C_5$ | $-1.3580 \times 10^{-3}$ | $C_6$ | $-4.5982 \times 10^{-3}$ |
| $C_7$ | $-5.0878 \times 10^{-5}$ | $C_8$ | $2.6592 \times 10^{-5}$ | $C_9$ | $-3.7474 \times 10^{-5}$ |
| $C_{10}$ | $1.2026 \times 10^{-5}$ | $C_{11}$ | $3.3957 \times 10^{-7}$ | $C_{12}$ | $6.5363 \times 10^{-8}$ |
| $C_{13}$ | $-5.0805 \times 10^{-7}$ | $C_{14}$ | $2.7924 \times 10^{-7}$ | $C_{15}$ | $1.9224 \times 10^{-7}$ |
| $C_{16}$ | $4.7646 \times 10^{-8}$ | $C_{17}$ | $5.7198 \times 10^{-8}$ | $C_{18}$ | $8.5786 \times 10^{-9}$ |
| $C_{19}$ | $6.0267 \times 10^{-11}$ | $C_{20}$ | $3.6213 \times 10^{-8}$ | $C_{21}$ | $2.4396 \times 10^{-8}$ |

FFS④

| | | | | | |
|---|---|---|---|---|---|
| $C_4$ | $-6.9833 \times 10^{-3}$ | $C_5$ | $-1.3736 \times 10^{-4}$ | $C_6$ | $-7.4147 \times 10^{-3}$ |
| $C_7$ | $2.5977 \times 10^{-5}$ | $C_8$ | $-5.5362 \times 10^{-7}$ | $C_9$ | $1.0948 \times 10^{-5}$ |
| $C_{10}$ | $-1.2716 \times 10^{-5}$ | $C_{11}$ | $4.4384 \times 10^{-9}$ | $C_{12}$ | $8.2269 \times 10^{-7}$ |
| $C_{13}$ | $9.9689 \times 10^{-7}$ | $C_{14}$ | $1.7219 \times 10^{-6}$ | $C_{15}$ | $6.6950 \times 10^{-7}$ |
| $C_{16}$ | $-3.6728 \times 10^{-8}$ | $C_{17}$ | $-6.3594 \times 10^{-8}$ | $C_{18}$ | $1.5462 \times 10^{-8}$ |
| $C_{19}$ | $-1.1542 \times 10^{-7}$ | $C_{20}$ | $-3.8596 \times 10^{-8}$ | $C_{21}$ | $-8.4733 \times 10^{-8}$ |

Displacement and tilt(1)

| | | | | | | | |
|---|---|---|---|---|---|---|---|
| X | 0.00 | Y | 7.36 | Z | 29.28 |
| $\alpha$ | 20.75 | $\beta$ | 0.00 | $\gamma$ | 0.00 |

Displacement and tilt(2)

| | | | | | | | |
|---|---|---|---|---|---|---|---|
| X | 0.00 | Y | 0.81 | Z | 40.18 |
| $\alpha$ | −12.75 | $\beta$ | 0.00 | $\gamma$ | 0.00 |

-continued

| Displacement and tilt(3) | | | | | |
|---|---|---|---|---|---|
| X | 0.00 | Y | 27.08 | Z | 35.51 |
| α | 72.48 | β | 0.00 | γ | 0.00 |

| Displacement and tilt(4) | | | | | |
|---|---|---|---|---|---|
| X | 0.00 | Y | 35.49 | Z | 38.16 |
| α | 58.51 | β | 41.34 | γ | 62.89 |

| Displacement and tilt(5) | | | | | |
|---|---|---|---|---|---|
| X | 44.00 | Y | 36.44 | Z | 25.81 |
| α | 106.56 | β | −60.73 | γ | −83.58 |

| Displacement and tilt(6) | | | | | |
|---|---|---|---|---|---|
| X | 32.00 | Y | 19.81 | Z | 25.33 |
| α | −107.24 | β | 18.41 | γ | 8.59 |

| Displacement and tilt(7) | | | | | |
|---|---|---|---|---|---|
| X | 32.00 | Y | 47.11 | Z | 41.83 |
| α | 72.48 | β | 0.00 | γ | 0.00 |

| Displacement and tilt(8) | | | | | |
|---|---|---|---|---|---|
| X | 32.00 | Y | 49.02 | Z | 42.44 |
| α | 72.48 | β | 0.00 | γ | 29.24 |

EXAMPLE 2

| Surface No. Object plane | Radius of curvature | Surface separation | Displacement and tilt | Refractive index | Abbe's No. |
|---|---|---|---|---|---|
| | ∞ | −1000.00 | | | |
| 1 | ∞(Pupil) | | | | |
| 2 | ASS① | (1) | 1.5254 | 56.2 | |
| 3 | FFS①(RE) | (2) | 1.5254 | 56.2 | |
| 4 | ASS①(RE) | (1) | 1.5254 | 56.2 | |
| 5 | ∞(IIM) | (3) | 1.5254 | 56.2 | |
| 6 | FFS②(RE) | (4) | 1.5254 | 56.2 | |
| 7 | FFS③(RE) | (5) | 1.5254 | 56.2 | |
| 8 | FFS④(RE) | (6) | 1.5254 | 56.2 | |
| 9 | ASS②(RE) | (7) | | | |
| Image plane | ∞ | (8) | | | |

| ASS① | |
|---|---|
| R | −83.20 |
| K | 0.0000 |
| A | $2.7572 \times 10^{-6}$ |
| B | $-8.0590 \times 10^{-10}$ |

| ASS② | |
|---|---|
| R | −16.07 |
| K | 0.0000 |
| A | $1.0135 \times 10^{-4}$ |

FFS①

| | | | | | |
|---|---|---|---|---|---|
| $C_4$ | $-9.4211 \times 10^{-3}$ | $C_6$ | $-1.0652 \times 10^{-2}$ | $C_8$ | $4.9563 \times 10^{-6}$ |
| $C_{10}$ | $4.2873 \times 10^{-5}$ | $C_{11}$ | $-3.5143 \times 10^{-8}$ | $C_{13}$ | $3.5874 \times 10^{-7}$ |
| $C_{15}$ | $-7.1617 \times 10^{-7}$ | $C_{17}$ | $-1.9762 \times 10^{-8}$ | $C_{19}$ | $-3.5068 \times 10^{-8}$ |
| $C_{21}$ | $-5.6908 \times 10^{-8}$ | | | | |

FFS②

| | | | | | |
|---|---|---|---|---|---|
| $C_4$ | $-2.3265 \times 10^{-4}$ | $C_5$ | $2.5719 \times 10^{-3}$ | $C_6$ | $-5.6313 \times 10^{-3}$ |
| $C_7$ | $-6.9711 \times 10^{-5}$ | $C_8$ | $-4.6909 \times 10^{-4}$ | $C_9$ | $6.8773 \times 10^{-5}$ |
| $C_{10}$ | $-2.5412 \times 10^{-4}$ | $C_{11}$ | $-7.9766 \times 10^{-7}$ | $C_{12}$ | $-1.2161 \times 10^{-5}$ |
| $C_{13}$ | $4.1658 \times 10^{-6}$ | $C_{14}$ | $-8.8727 \times 10^{-6}$ | $C_{15}$ | $2.2400 \times 10^{-5}$ |
| $C_{16}$ | $1.6733 \times 10^{-6}$ | $C_{17}$ | $5.6098 \times 10^{-6}$ | $C_{18}$ | $6.2886 \times 10^{-6}$ |
| $C_{19}$ | $6.5129 \times 10^{-6}$ | $C_{20}$ | $2.6957 \times 10^{-6}$ | $C_{21}$ | $1.2697 \times 10^{-6}$ |

FFS③

| | | | | | |
|---|---|---|---|---|---|
| $C_4$ | $-4.4861 \times 10^{-3}$ | $C_5$ | $-1.3580 \times 10^{-3}$ | $C_6$ | $-4.5982 \times 10^{-3}$ |
| $C_7$ | $-5.0878 \times 10^{-5}$ | $C_8$ | $2.6592 \times 10^{-5}$ | $C_9$ | $-3.7474 \times 10^{-5}$ |
| $C_{10}$ | $1.2026 \times 10^{-5}$ | $C_{11}$ | $3.3957 \times 10^{-7}$ | $C_{12}$ | $6.5363 \times 10^{-8}$ |
| $C_{13}$ | $-5.0805 \times 10^{-7}$ | $C_{14}$ | $2.7924 \times 10^{-7}$ | $C_{15}$ | $1.9224 \times 10^{-7}$ |
| $C_{16}$ | $4.7646 \times 10^{-8}$ | $C_{17}$ | $5.7198 \times 10^{-8}$ | $C_{18}$ | $8.5786 \times 10^{-9}$ |
| $C_{19}$ | $6.0267 \times 10^{-11}$ | $C_{20}$ | $3.6213 \times 10^{-8}$ | $C_{21}$ | $2.4396 \times 10^{-8}$ |

FFS④

| | | | | | |
|---|---|---|---|---|---|
| $C_4$ | $-6.9833 \times 10^{-3}$ | $C_5$ | $-1.3736 \times 10^{-4}$ | $C_6$ | $-7.4147 \times 10^{-3}$ |
| $C_7$ | $2.5977 \times 10^{-5}$ | $C_8$ | $-5.5362 \times 10^{-7}$ | $C_9$ | $1.0948 \times 10^{-5}$ |
| $C_{10}$ | $-1.2716 \times 10^{-5}$ | $C_{11}$ | $4.4384 \times 10^{-9}$ | $C_{12}$ | $8.2269 \times 10^{-7}$ |
| $C_{13}$ | $9.9689 \times 10^{-7}$ | $C_{14}$ | $1.7219 \times 10^{-6}$ | $C_{15}$ | $6.6950 \times 10^{-7}$ |
| $C_{16}$ | $-3.6728 \times 10^{-8}$ | $C_{17}$ | $-6.3594 \times 10^{-8}$ | $C_{18}$ | $1.5462 \times 10^{-8}$ |
| $C_{19}$ | $-1.1542 \times 10^{-7}$ | $C_{20}$ | $-3.8596 \times 10^{-8}$ | $C_{21}$ | $-8.4733 \times 10^{-8}$ |

| Displacement and tilt(1) | | | | | |
|---|---|---|---|---|---|
| X | 0.00 | Y | 7.36 | Z | 29.28 |
| α | 20.75 | β | 0.00 | γ | 0.00 |

| Displacement and tilt(2) | | | | | |
|---|---|---|---|---|---|
| X | 0.00 | Y | 0.81 | Z | 40.18 |
| α | −12.75 | β | 0.00 | γ | 0.00 |

| Displacement and tilt(3) | | | | | |
|---|---|---|---|---|---|
| X | 0.00 | Y | 27.08 | Z | 35.51 |
| α | 72.48 | β | 0.00 | γ | 0.00 |

| Displacement and tilt(4) | | | | | |
|---|---|---|---|---|---|
| X | 0.00 | Y | 35.49 | Z | 38.16 |
| α | 58.51 | β | 41.34 | γ | 62.89 |

| Displacement and tilt(5) | | | | | |
|---|---|---|---|---|---|
| X | 44.00 | Y | 36.44 | Z | 25.81 |
| α | 106.56 | β | −60.73 | γ | −83.58 |

| Displacement and tilt(6) | | | | | |
|---|---|---|---|---|---|
| X | 32.00 | Y | 19.81 | Z | 25.33 |
| α | −107.24 | β | 18.41 | γ | 8.59 |

| Displacement and tilt(7) | | | | | |
|---|---|---|---|---|---|
| X | 32.00 | Y | 47.11 | Z | 41.83 |
| α | 72.48 | β | 0.00 | γ | 0.00 |

| Displacement and tilt(8) | | | | | |
|---|---|---|---|---|---|
| X | 32.00 | Y | 49.02 | Z | 42.44 |
| α | 72.48 | β | 0.00 | γ | 29.24 |

In the image display apparatus according to the present invention, if a display light beam emitted from the image display device 1 impinges on a boundary portion 5 (FIG. 2) between the left and right reflecting surfaces 12L and 12R, which are positioned closest to the entrance surface 11 of the optical path splitting element 10 among the optical surfaces in the left and right optical paths, the light beam may be reflected from the boundary portion 5 to become ghost light. Therefore, it is desirable that, as shown in part (a) of FIG. 5, the boundary portion 5 and its vicinities should be coated with a black paint or subjected to a diffusion treatment to form an anti-reflection member 6 for preventing such reflection, thereby absorbing or diffusing a light beam portion (shown by the broken lines) of the display light beam 7 from the image display device 1 that is incident on the boundary portion 5. It should be noted that light beam portions of the display light beam 7 that are shown by the solid lines are led to the left and right optical paths as light beams effectively used for the display.

Figure 5A:
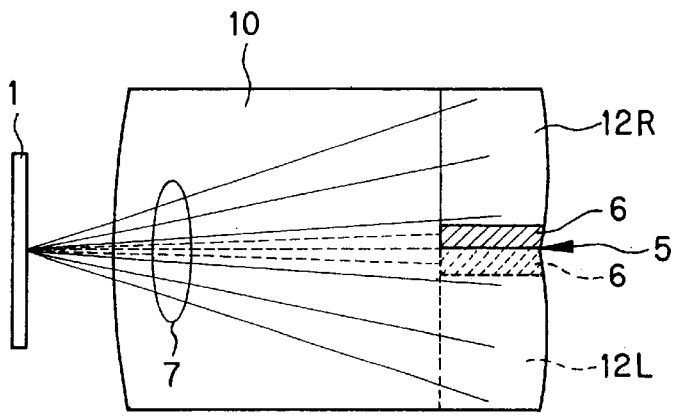
FIG. 5 is a diagram for describing an anti-reflection member and a distributed light reinforcing member usable in the present invention.
Figure 5B:
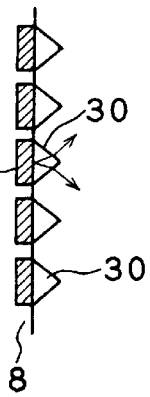

When an image display device 8 having a small exit angle of display light is used as the image display device 1, as shown in part (b) of FIG. 5, it is desirable to place a light beam distributing microprism 30 in correspondence to each pixel 9. The light beam distributing microprism 30 has a sectional configuration as shown in the figure by way of example to serve as a distributed light reinforcing member whereby the exit angle of display light emitted from each pixel 9 is increased in the directions of the left and right optical paths. In place of the light beam distributing microprism 30, a transmission type diffraction grating arranged to weaken the intensity of zeroth-order transmitted light and to intensify ±1st-order diffracted light may be positioned in close proximity to the display surface of the image display device 1.

Incidentally, it is possible to form a stationary or portable image display apparatus allowing observation with both eyes by properly supporting the above-described viewing optical system.

Figure 6:
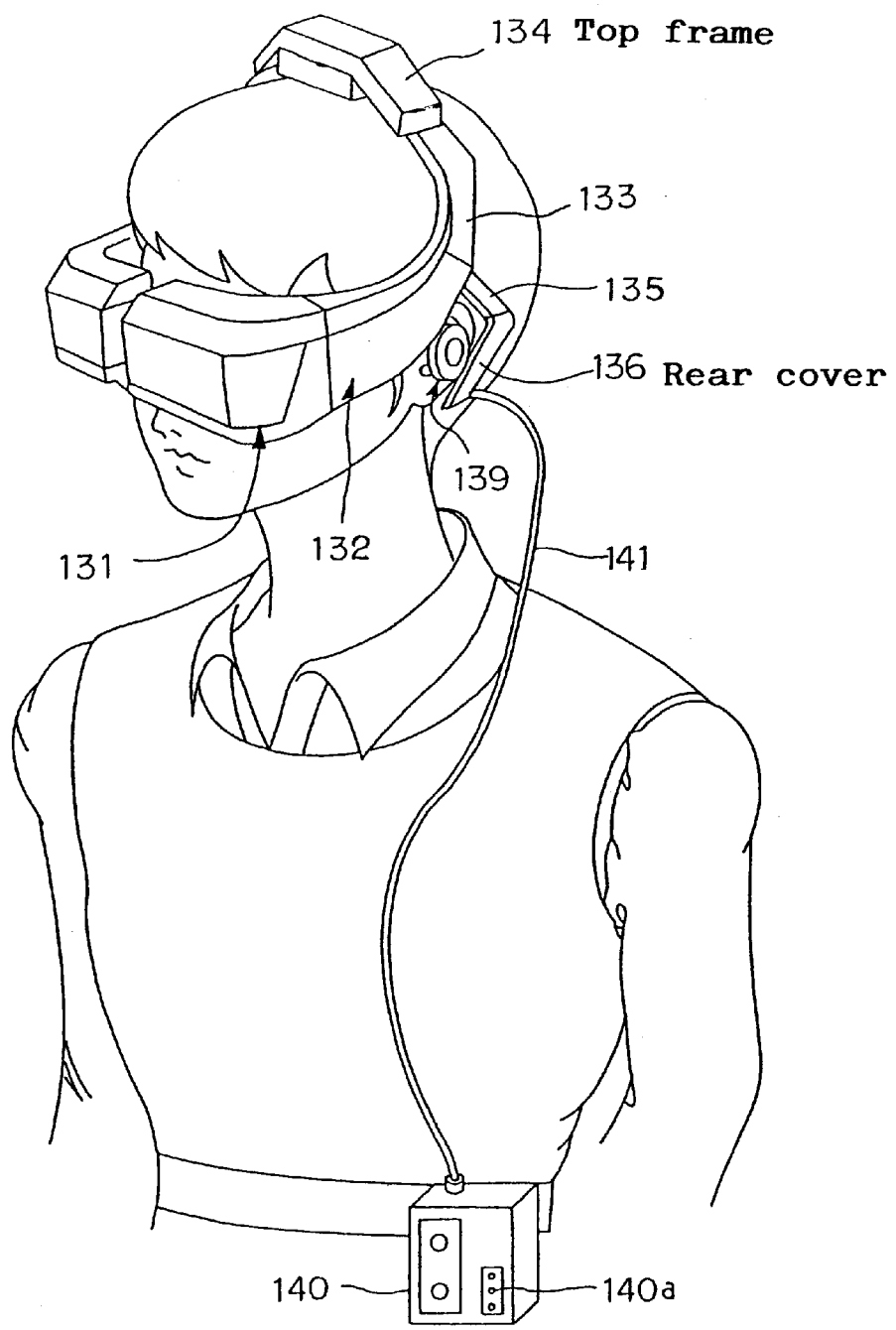
FIG. 6 is a diagram showing the arrangement of an image display apparatus according to the present invention as arranged to be fitted for both eyes.

FIG. 6 shows the arrangement of the image display apparatus designed to be fitted for both eyes. In FIG. 6, reference numeral 131 denotes a display apparatus body unit, which is fixed by a support member through the observer's head so that the display apparatus body unit 131 is held in front of both the observer's eyes. The support member has a pair of front frames 132 (left and right) each joined at one end thereof to the display apparatus body unit 131. The left and right front frames 132 extend from the observer's temples to the upper portions of his/her ears, respectively. A pair of rear frames 133 (left and right) are joined to the other ends of the front frames 132, respectively, and extend over the side portions of the observer's head. The support member further has a top frame 134 joined at both ends thereof to the other ends of the left and right rear frames 133, respectively, so that the top frame 134 supports the top of the observer's head.

A rear plate 135 is joined to one front frame 132 near the joint to the rear frame 133. The rear plate 135 is formed from an elastic member, e.g. a metal leaf spring. A rear cover 136, which constitutes a part of the support member, is joined to the rear plate 135 so that the rear cover 136 can support the apparatus at a position behind the observer's ear in a region extending from the back part of the head to the base of the neck. A speaker 139 is mounted inside the rear plate 135 or the rear cover 136 at a position corresponding to the observer's ear.

A cable 141 for transmitting external image and sound signals is led out from the display apparatus body unit 131. The cable 141 extends through the top frame 134, the rear frames 133, the front frames 132 and the rear plate 135 and projects to the outside from the rear end of the rear plate 135 or the rear cover 136. The cable 141 is connected to a video-replaying unit 140. It should be noted that reference numeral 140a in the figure denotes a switch and volume control part of the video-replaying unit 140.

The cable 141 may have a jack and plug arrangement attached to the distal end thereof so that the cable 141 can be connected to an existing video deck or the like. The cable 141 may also be connected to a TV signal-receiving tuner so as to enable the user to enjoy watching TV. Alternatively, the cable 141 may be connected to a computer to receive computer graphic images or message images or the like from the computer. To eliminate the bothersome cord, the apparatus may be arranged to receive external radio signals through an antenna connected thereto.

As will be clear from the foregoing description, the present invention provides a compact optical path splitting element having a reduced number of components and also provide an image display apparatus using the optical path splitting element. That is, the present invention provides an optical path splitting element having at least two split axial principal rays each extending from the center of an object to the center of an image. The optical path splitting element uses a three-dimensional optical system in which bent segments forming each of the axial principal rays lie in at least two planes, thereby making the optical path splitting element compact in size. At the same time, a power is given to the optical path splitting element to reduce the number of components thereof.

I claim:

1. An optical path splitting element for splitting a light beam from a single object into two optical paths, comprising at least two pairs of reflecting surfaces, wherein the optical paths in said optical path splitting element are not in plane symmetry with each other but in 180-degree rotational symmetry with respect to only a straight line passing through a center of the object, said at least two pairs of reflecting surfaces being disposed in said optical paths, wherein when a pair of reflecting surfaces closest to an object side of said optical path splitting element among said at least two pairs of reflecting surfaces are defined as a left first reflecting surface and a right first reflecting surface, respectively, and a pair of reflecting surfaces closest to an exit side of said optical path splitting element among said at least two pairs of reflecting surfaces are defined as a left final reflecting surface and a right final reflecting surface, respectively, the optical paths in said optical path splitting element are arranged so that an entering optical axis of an axial principal ray incident on the left first reflecting surface and an exiting optical axis of the axial principal ray exiting from the left final reflecting surface are not coplanar with each other, and an entering optical axis of an axial principal ray incident on the right first reflecting surface and an exiting optical axis of the axial principal ray exiting from the right final reflecting surface are not coplanar with each other, and wherein at least one pair of said at least two pairs of reflecting surfaces are formed from rotationally asymmetric curved reflecting surfaces having a function of correcting decentration aberrations.

2. An optical path splitting element according to claim 1, wherein said at least two pairs of reflecting surfaces are arranged so that optical axes exiting said optical path splitting element extend in approximately a same direction.

3. An optical path splitting element according to claim 2, wherein said at least two pairs of reflecting surfaces are arranged so that the optical axes exiting said optical path splitting element are approximately parallel to each other.

4. An optical path splitting element according to claim 1, which has at least three pairs of reflecting surfaces, wherein said at least three pairs of reflecting surfaces are formed from rotationally asymmetric curved reflecting surfaces having a function of correcting decentration aberrations.

5. An optical path splitting element according to claim 1, which comprises a prism member, wherein all of said at least two pairs of reflecting surfaces are back-coated reflecting surfaces formed on surfaces of said prism member.

6. An optical path splitting element according to claim 1, which is used as at least a part of a viewing optical system, wherein an image display device is placed at a position of said object.

7. An optical path combining element using said optical path splitting element according to claim 1 to combine together light rays in two optical paths.

8. An image display apparatus comprising:

an optical path splitting element for splitting a light beam from a single object into two optical paths, wherein the optical paths in said optical path splitting element are not in plane symmetry with each other but in 180-degree rotational symmetry with respect to only a straight line passing through a center of the object, said optical path splitting element having at least two pairs of reflecting surfaces in said optical paths, wherein when a pair of reflecting surfaces closest to an object side of said optical path splitting element among said at least two pairs of reflecting surfaces are defined as a left first reflecting surface and a right first reflecting surface, respectively, and a pair of reflecting surfaces closest to an exit side of said optical path splitting element among said at least two pairs of reflecting surfaces are defined as a left final reflecting surface and a right final reflecting surface, respectively, the optical paths in said optical path splitting element are arranged so that an entering optical axis of an axial principal ray incident on the left first reflecting surface and an exiting optical axis of the axial principal ray exiting from the left final reflecting surface are not coplanar with each other, and an entering optical axis of an axial principal ray incident on the right first reflecting surface and an exiting optical axis of the axial principal ray exiting from the right final reflecting surface are not coplanar with each other, and wherein at least one pair of said at least two pairs of reflecting surfaces are formed from rotationally asymmetric curved reflecting surfaces having a function of correcting decentration aberrations; and an image display device placed at a position of said object;

wherein left and right eyeballs of an observer are placed at left and right exit pupils formed in left and right optical paths exiting said optical path splitting element, thereby allowing observation of an image displayed by said image display device.

9. An image display apparatus according to claim 8, wherein said optical path splitting element is formed from a prism member, said prism member having:

an entrance surface through which a display light beam from said image display device enters said prism member so as to be incident on said left first reflecting surface and said right first reflecting surface;

a left exit surface through which a light beam reflected from said left final reflecting surface exits said prism member; and a right exit surface through which a light beam reflected from said right final reflecting surface exits said prism member;

wherein said left first reflecting surface and said right first reflecting surface are positioned to face both said image display device and said entrance surface.

10. An image display apparatus according to claim 9, wherein an anti-reflection member is provided for an area including a boundary portion between said left first reflecting surface and said right first reflecting surface to prevent light rays emitted perpendicularly from a central region of said image display device from being reflected as ghost light.

11. An image display apparatus according to claim 8, wherein said image display device is rotated through a desired angle about the straight line passing through the center of said object as an axis of rotation so that a horizontal direction of an image display area of said image display device is at an angle to a plane containing the left and right optical paths exiting said optical path splitting element.

12. An image display apparatus according to claim 8, wherein the following condition is satisfied:

$$10°<\theta<150° \tag{1}$$

where $\theta$ is an angle formed between axial principal rays of left and right light beams led from each pixel located at least in a central portion of said image display device to the left and right eyeballs of the observer.

13. An image display apparatus according to claim 8, wherein said optical path splitting element forms an intermediate image of the image displayed by said image display device in each of said left and right optical paths.

14. An image pickup apparatus comprising:

said image display apparatus according to claim 8; and an image pickup device provided in place of said image display device;

wherein said exit pupils are arranged as entrance pupils through which a light beam from a subject passes, and a subject image is formed on said image pickup device.

15. A projection apparatus comprising:

said image display apparatus according to claim 8;

a projection object provided in place of said image display device; and a screen placed in front of said exit pupils to form a projected image of said projection object on said screen.

* * * * *